United States Patent
Yamamoto et al.

(10) Patent No.: US 11,904,790 B2
(45) Date of Patent: Feb. 20, 2024

(54) IN-SEAT AIRBAG DEVICE

(71) Applicant: TOYOTA JIDOSHA KABUSHIKI KAISHA, Toyota (JP)

(72) Inventors: Takeshi Yamamoto, Toki (JP); Toshiki Iwama, Toyota (JP); Mitsuyoshi Ohno, Miyoshi (JP); Masashi Hotta, Gifu-ken (JP); Yoshito Kusuhara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/135,770

(22) Filed: Apr. 18, 2023

(65) Prior Publication Data

US 2023/0339421 A1   Oct. 26, 2023

(30) Foreign Application Priority Data

Apr. 26, 2022  (JP) ................. 2022-072612

(51) Int. Cl.
*B60R 21/207* (2006.01)
*B60R 21/2338* (2011.01)
*B60R 21/231* (2011.01)
*B60R 21/261* (2011.01)
*B60R 21/00* (2006.01)

(52) U.S. Cl.
CPC .... *B60R 21/207* (2013.01); *B60R 2021/0048* (2013.01); *B60R 2021/23146* (2013.01); *B60R 2021/23386* (2013.01); *B60R 2021/2612* (2013.01)

(58) Field of Classification Search
CPC .......... B60R 21/207; B60R 2021/0048; B60R 2021/23146; B60R 2021/23386; B60R 2021/2612
See application file for complete search history.

(56) References Cited

U.S. PATENT DOCUMENTS

2006/0131847 A1   6/2006  Sato et al.

FOREIGN PATENT DOCUMENTS

| DE | 4440258 A1 | * | 5/1996 | ....... B60R 21/01558 |
|----|---|---|---|---|
| JP | 2006-008105 A | | 1/2006 | |
| JP | 2017-197004 A | | 11/2017 | |
| JP | 2019-137307 A | | 8/2019 | |
| WO | 2019/166268 A1 | | 6/2019 | |
| WO | WO-2019121222 A1 | * | 6/2019 | ........... B60R 21/231 |

* cited by examiner

*Primary Examiner* — Faye M Fleming
(74) *Attorney, Agent, or Firm* — Dinsmore & Shohl LLP

(57) ABSTRACT

An in-seat airbag device including an airbag main body having a front-rear chamber that expands past a side of a head of a passenger toward a seat front side and is disposed at the side of the head of the passenger, and a distal end chamber that expands from a seat front side end portion of the front-rear chamber toward a seat width direction inner side and is disposed at a seat front side of a face of the passenger, wherein the airbag main body and a seatback frame are connected by a force limiter mechanism that moves the airbag main body toward a seat front side when a load, which is toward a seat front side and is applied to the airbag main body, exceeds a predetermined threshold value at a time of head restraining when the head of the passenger is restrained.

9 Claims, 13 Drawing Sheets

IN-SEAT AIRBAG DEVICE

CROSS-REFERENCE TO RELATED APPLICATION

This application is based on and claims priority under 35 USC 119 from Japanese Patent Application No. 2022-072612 filed on Apr. 26, 2022, the disclosure of which is incorporated by reference herein.

BACKGROUND

Technical Field

The present disclosure relates to an in-seat airbag device.

Related Art

There is conventionally known a side airbag device having: an airbag main body portion that, at the time of a collision from an obliquely front side of a vehicle, expands frontward from one side portion of a seatback, and is disposed at a side of the upper half (including the head) of the passenger; and an airbag protruding portion that expands from this airbag main body portion toward the seat width direction inner side and is disposed in front of the face of the passenger, wherein these both portions are joined together by a planar tether (see, for example, Japanese Patent Application Laid-Open (JP-A) No. 2006-008105).

However, the above-described side airbag device is structured so as to restrain only the head of the passenger, who moves toward an obliquely front side, by the airbag projecting portion that is disposed in front of the face of the passenger. Therefore, at the time when the head of the passenger is restrained, there are cases in which the amount of movement of the head of the passenger toward the front side is small with respect to the amount of movement of the chest region of the passenger toward the front side that is determined by the restraining force of the seatbelt, and there are cases in which rearward tilting (rearward bending) of the neck of the passenger is great.

SUMMARY

The present disclosure provides an in-seat airbag device that can suppress rearward tilting of the neck of a passenger at the time when the head of the passenger is restrained.

An in-seat airbag device of a first aspect relating to the present disclosure includes an airbag main body having a front-rear chamber that, due to gas jetted from an inflator that operates due to a collision of a vehicle being detected or predicted, expands past a side of a head of a passenger toward a seat front side and is disposed at the side of the head of the passenger, and a distal end chamber that expands from a seat front side end portion of the front-rear chamber toward a seat width direction inner side and is disposed at a seat front side of a face of the passenger, wherein the airbag main body and a seatback frame are connected by a force limiter mechanism that moves the airbag main body toward a seat front side when a load, which is toward a seat front side and is applied to the airbag main body, exceeds a predetermined threshold value at a time of head restraining when the head of the passenger is restrained.

In accordance with the disclosure of the first aspect, when a collision of the vehicle is detected or predicted, the inflator operates and jets-out gas. The front-rear chamber expands past a side of the head of the passenger toward the seat front side and is disposed at the side of the head of the passenger, and the distal end chamber expands from the seat front side end portion of the front-rear chamber toward the seat width direction inner side and is disposed at the seat front side of the face of the passenger. Here, the airbag main body and a seatback frame are connected by a force limiter mechanism. The force limiter mechanism moves the airbag main body toward the seat front side when the load, which is toward the seat front side and is applied to the airbag main body, exceeds a predetermined threshold value at a time of head restraining when the head of the passenger is restrained. Accordingly, at the time of restraining the head of the passenger, the amount of movement of the head of the passenger toward the front side becoming small, with respect to the amount of movement of the chest region of the passenger toward the front side that is determined by the restraining force of the seatbelt, is suppressed. Namely, the head of the passenger is moved over a long stroke, and the load applied to the head of the passenger is kept low. Accordingly, rearward tilting of the neck of the passenger is suppressed.

Further, an in-seat airbag device of a second aspect is the in-seat airbag device of the first aspect, wherein the force limiter mechanism has: a movable member including a supply pipe supplying gas jetted-out from the inflator to the airbag main body that is attached to an upper end portion of the movable member, the movable member being supported at the seatback frame such that a lower end portion thereof can rotate with a seat width direction being an axial direction; and an energy absorbing portion that is provided between the seatback frame and the supply pipe or the movable member, and that, when the load exceeds the predetermined threshold value, permits rotation of the movable member toward a seat front side while absorbing energy.

In accordance with the disclosure of the second aspect, at the time when the head of the passenger is restrained, when the load, which is toward the seat front side and is applied to the airbag main body, exceeds the predetermined threshold value, the energy absorbing portion permits rotation of the movable member toward the seat front side while absorbing energy. Namely, the moveable member and the supply pipe rotate toward the seat front side together with the airbag main body. Accordingly, at the time when the head of the passenger is restrained, the head of the passenger is made to move over a long stroke, and the load applied to the head of the passenger is kept low. Accordingly, rearward tilting of the neck of the passenger is suppressed effectively.

Further, an in-seat airbag device of a third aspect is the in-seat airbag device of the first aspect, wherein the force limiter mechanism has: a supply pipe connected to an inflator that is fixed to the seatback frame, and supplying the gas, which is jetted-out from the inflator, to the airbag main body; a tube that has excess length, accommodates the supply pipe at an interior thereof, and connects the inflator and the airbag main body; a reaction force plate provided at a seat rear side end portion of the airbag main body; and an energy absorbing portion that is provided between the reaction force plate and the seatback frame, and that, when the load exceeds the predetermined threshold value, permits movement of the reaction force plate toward a seat front side while absorbing energy.

In accordance with the disclosure of the third aspect, at the time when the head of the passenger is restrained, when the load, which is toward the seat front side and is applied to the airbag main body, exceeds the predetermined threshold value, the energy absorbing portion permits movement of the reaction force plate toward the seat front side while absorbing energy. Namely, the reaction force plate moves toward the seat front side together with the airbag main body. Accordingly, at the time when the head of the passenger is restrained, the head of the passenger is made to move over a long stroke, and the load applied to the head of the passenger is kept low. Accordingly, rearward tilting of the neck of the passenger is suppressed effectively. Further, at the time when the reaction force plate moves toward the seat front side together with the airbag main body, the airbag main body comes apart from the supply pipe, but because the tube extends, gas continues to be supplied to the airbag main body. Accordingly, even though the airbag main body moves toward the seat front side, the state of restraining the head of the passenger is maintained effectively. Further, because a movable member is unnecessary, the structure of the force limiter mechanism is simplified.

Further, an in-seat airbag device of a fourth aspect is the in-seat airbag device of the second aspect or the third aspect, wherein the force limiter mechanism is structured so as to not operate at a load toward a seat front side at a time of inflation/expansion of the airbag main body.

In accordance with the disclosure of the fourth aspect, the force limiter mechanism does not operate at the load toward the seat front side at the time of inflation/expansion of the airbag main body. Accordingly, the head of the passenger is restrained more effectively as compared with a case in which the force limiter mechanism is operated at the load toward the seat front side at the time of inflation/expansion of the airbag main body.

Further, an in-seat airbag device of a fifth aspect is the in-seat airbag device of the fourth aspect, wherein: the energy absorbing portion includes a plate that absorbs energy by plastically deforming, and a thickness of one deformation region of the plate is set to be thicker than a thickness of other deformation regions of the plate, such that the plate can withstand the load toward the seat front side at the time of inflation/expansion of the airbag main body.

In accordance with the disclosure of the fifth aspect, by setting the thickness of one deformation region of the plate, which absorbs energy by plastically deforming, to be thicker than the thickness of the other deformation regions of the plate, the plate can withstand the load toward the seat front side at the time of inflation/expansion of the airbag main body. Accordingly, the structure of the energy absorbing portion is simplified as compared with a case in which the energy absorbing portion is made to withstand the load toward the seat front side at the time of inflation/expansion of the airbag main body by using a method other than setting the thicknesses of the deformation regions of the plate.

Further, an in-seat airbag device of a sixth aspect is the in-seat airbag device of the fourth aspect, wherein the force limiter mechanism is structured to include an actuator that operates the force limiter mechanism at a time when the load exceeds the predetermined threshold value.

In accordance with the disclosure of the sixth aspect, the force limiter mechanism is operated by the actuator when the load, that is toward the seat front side and is applied to the airbag main body, exceeds the predetermined threshold value at the time of restraining the head of the passenger. Accordingly, the force limiter mechanism is operated more reliably, as compared with a case in which the force limiter mechanism is operated by using a method other than an actuator.

As described above, in accordance with the present disclosure, at an in-seat airbag device, rearward tilting of the neck of a passenger at the time when the head of the passenger is restrained can be suppressed.

BRIEF DESCRIPTION OF THE DRAWINGS

Exemplary embodiments of the present disclosure will be described in detail based on the following figures, wherein.

DETAILED DESCRIPTION

Embodiments relating to the present disclosure are described in detail hereinafter on the basis of the drawings. Note that, for convenience of explanation, arrow UP that is shown appropriately in the respective drawings indicates the seat upward direction, arrow FR indicates the seat forward direction, and arrow RH indicates the seat rightward direction. Accordingly, in the following description, when vertical, front-rear and left-right directions are mentioned without being specified, they refer to the vertical, front-rear and left-right of the vehicle seat. Further, the left-right direction has the same meaning as the seat width direction.

Figure 1:
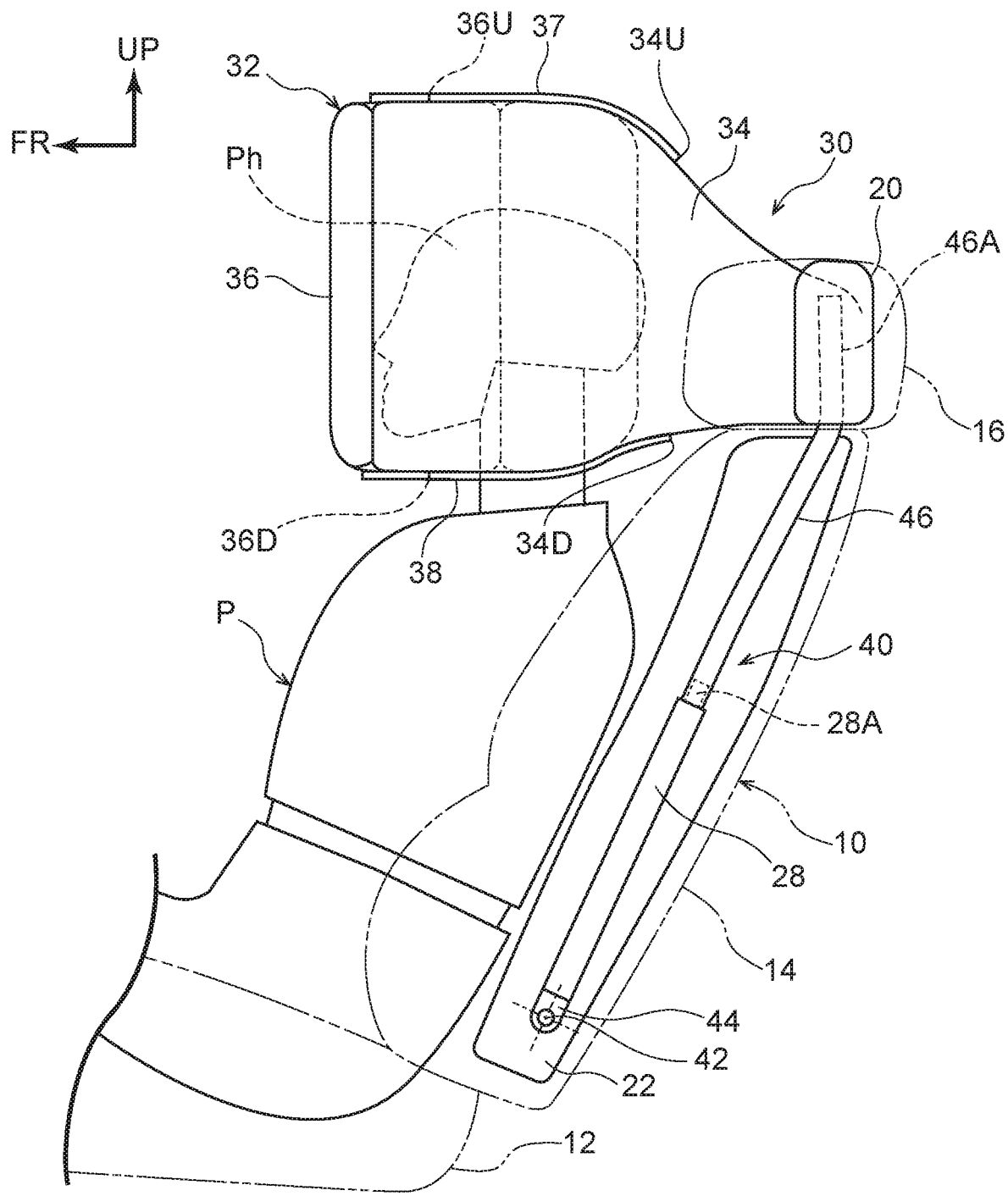
FIG. 1 is a side view illustrating a state after expansion of an in-seat airbag device relating to a first embodiment.
Figure 2:
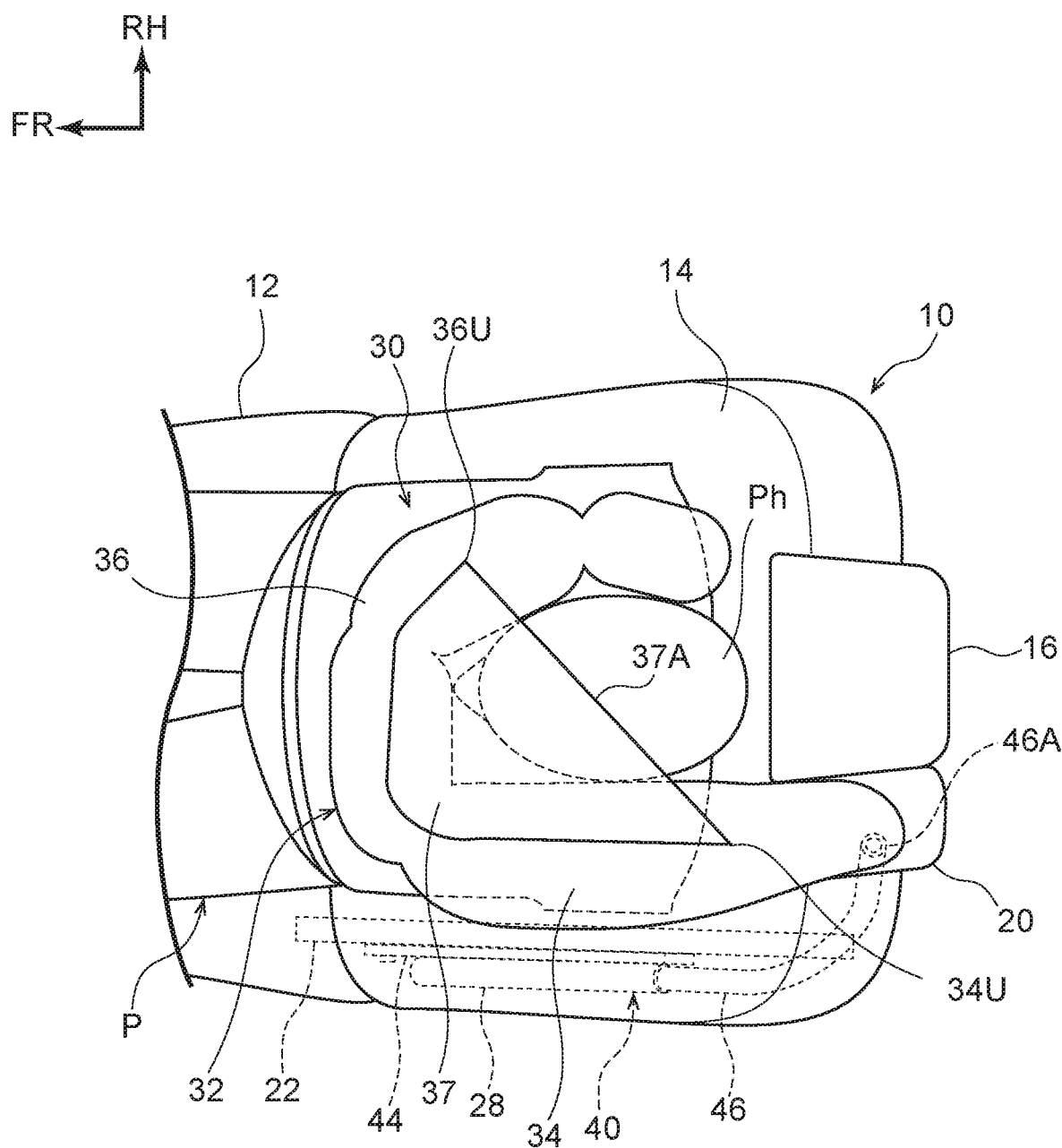
FIG. 2 is a plan view illustrating the state after expansion of the in-seat airbag device relating to the first embodiment.

As illustrated in FIG. 1 and FIG. 2, an in-seat airbag device (hereinafter simply called "airbag device") 30 relating to the present embodiment is provided at a seat width direction outer side (the left side in the illustrated structure) of a vehicle seat 10. Note that the vehicle seat 10 relating to the present embodiment is described as a rear seat, but the airbag device 30 may be provided at a front seat. Further, as an example, this rear seat is the rear seat that is at the side of the right side window (not illustrated).

Accordingly, an airbag main body 32 that is described later expands so as to pass between a head Ph of a passenger P who is at the side window side and the head of the passenger (not illustrated) who is at the center seat side. Note that the airbag main body 32 may expand so as to pass between the side window and the head Ph of the passenger P. Further, the "passenger P" in the present embodiment is a passenger corresponding to, as an example, an AM50 human dummy (50th percentile U.S. adult male).

First Embodiment

The airbag device 30 relating to the first embodiment is described first. As illustrated in FIG. 1 and FIG. 2, the vehicle seat 10 has a seat cushion 12 on which the passenger P sits (that supports the buttocks and thigh regions of the passenger P), a seatback 14 that supports the back portion of the passenger P, and a headrest 16 that supports the head Ph of the passenger P.

Figure 3:
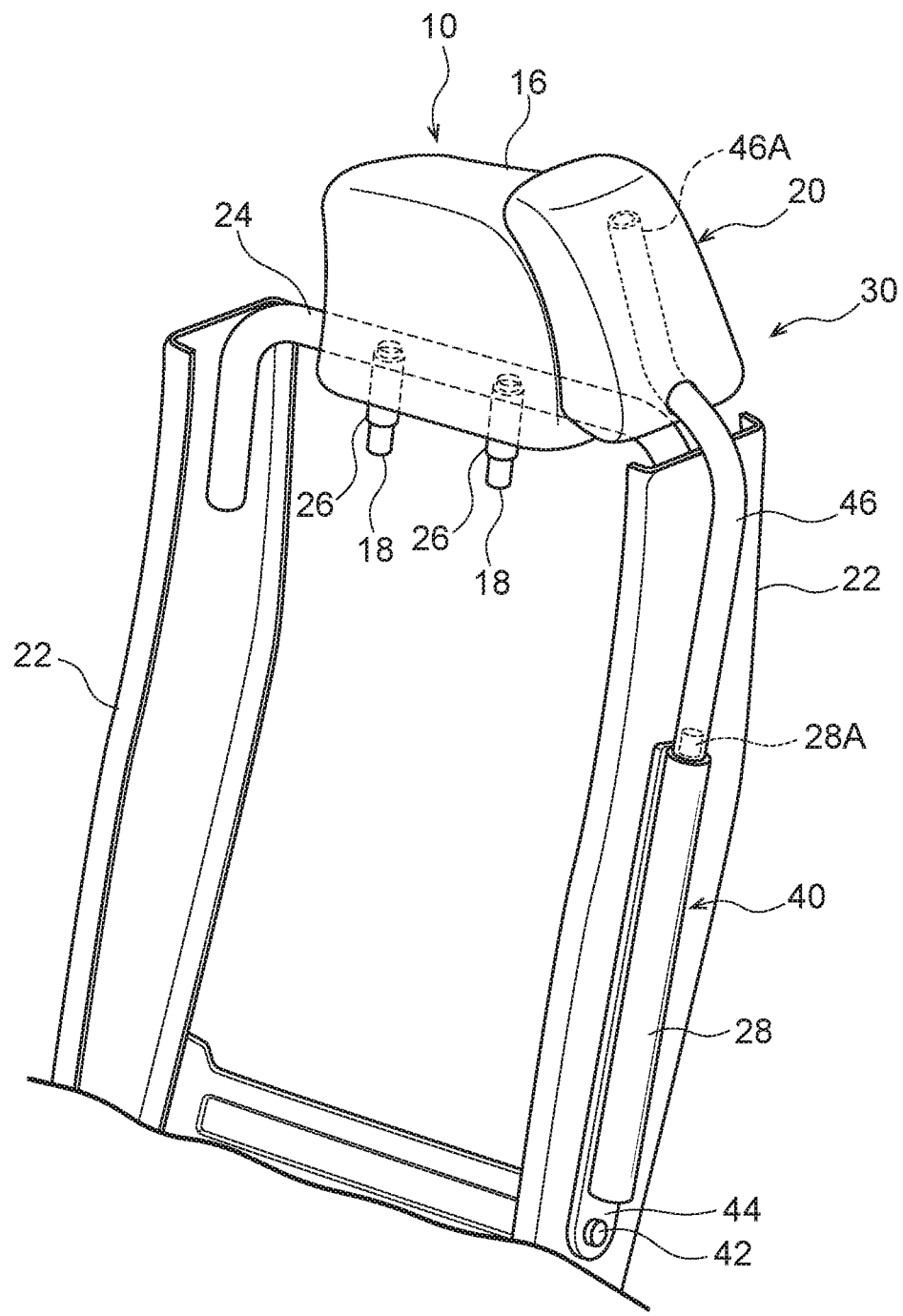
FIG. 3 is a perspective view illustrating a force limiter mechanism of the in-seat airbag device relating to the first embodiment.
Figure 4:
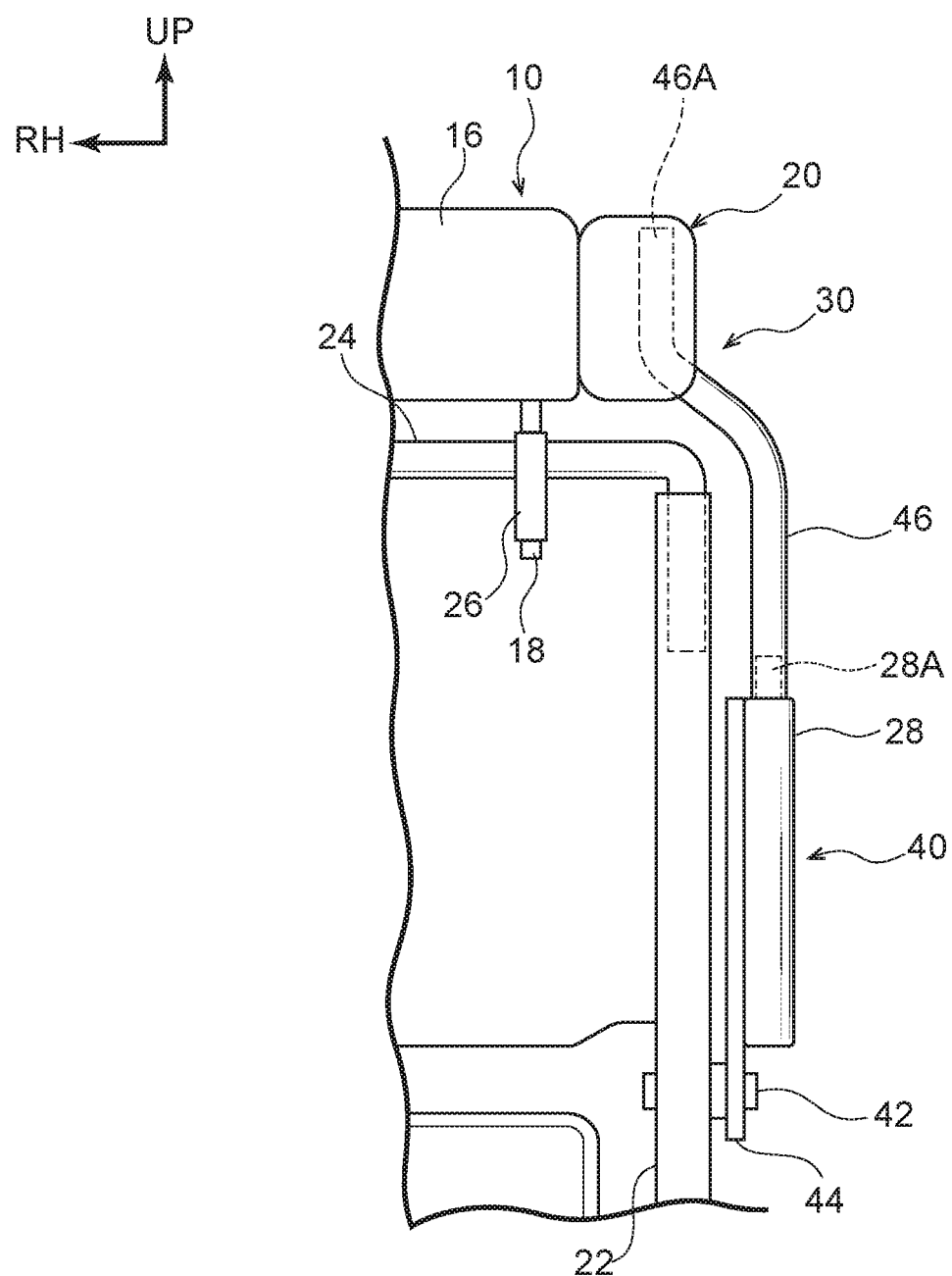
FIG. 4 is a front view of the left half, illustrating the structure of the force limiter mechanism of the in-seat airbag device relating to the first embodiment.

As illustrated in FIG. 3 and FIG. 4, the headrest 16 is provided so as to be able to be raised and lowered at the seat width direction center of the upper end portion of the seatback 14 (see FIG. 1 and FIG. 2). Specifically, a pair of left and right solid-cylindrical headrest stays 18 are provided at the seat width direction center of the lower surface of the headrest 16.

The respective headrest stays 18 are inserted through headrest supports 26, which are substantially cylindrical and are provided as a left-right pair at the seat width direction center of the upper end portion of the seatback 14 (an upper frame 24 that is described later), so as to be able to be raised and lowered and so as to be able to be fixed at plural, predetermined positions. Due thereto, the height position of the headrest 16 can be adjusted so as to conform to the position of the head Ph of the passenger P. Further, a case portion 20 that accommodates the airbag main body 32 that is described later is disposed at the left side of the headrest 16.

As illustrated in FIG. 1 and FIG. 2, the airbag device 30 has the airbag main body 32 that, due to gas being jetted-out from an inflator 28 that is described later, ruptures a portion of the case portion 20 and bursts forth, and expands from the rear side (specifically, the rear left side) of the head Ph of the passenger P seated in the vehicle seat 10 toward the front side.

The airbag main body 32 has a front-rear chamber 34 that expands past the left side of the head Ph of the passenger P toward the front side and is disposed at the left side of the head Ph of the passenger P (between the head Ph of the passenger P who is at the side window side and the head of the unillustrated passenger who is at the center seat side), and a distal end chamber 36 that expands from the front side end portion of the front-rear chamber 34 toward the seat width direction inner side and is disposed at the front side of the face of the passenger P and at the right side of the head Ph of the passenger P. Namely, this airbag main body 32 is bent substantially in the shape of the letter "J" as seen in plan view, and can restrain at least the head Ph of the passenger P.

Further, the airbag main body 32 has an upper tether 37 that is in the form of a thin cloth and joins an expansion direction intermediate portion 36U at the upper end portion of the distal end chamber 36 and an expansion direction intermediate portion 34U at the upper end portion of the front-rear chamber 34, and a lower tether 38 (see FIG. 1) that is in the form of a thin cloth and joins an expansion direction intermediate portion 36D (see FIG. 1) at the lower end portion of the distal end chamber 36 and an expansion direction intermediate portion 34D (see FIG. 1) at the lower end portion of the front-rear chamber 34.

More specifically, when the airbag main body 32 inflates and expands, as seen in plan view, the upper tether 37 forms a substantially right triangular shape whose hypotenuse is rear end edge portion 37A that is rectilinear and joins the expansion direction intermediate portion 36U at the upper end portion of the distal end chamber 36 and the expansion direction intermediate portion 34U at the upper end portion of the front-rear chamber 34.

Further, the peripheral edge portion of the upper tether 37, which is other than the rear end edge portion 37A thereof, is attached by sewing to the upper end portion of the front-rear chamber 34 and the upper end portion of the distal end chamber 36, from the expansion direction intermediate portion 34U at the upper end portion of the front-rear chamber 34 to the expansion direction intermediate portion 36U at the upper end portion of the distal end chamber 36.

Similarly, when the airbag main body 32 inflates and expands, as seen in a bottom view, the lower tether 38 forms a substantially right triangular shape whose hypotenuse is the rear end edge portion (not illustrated) that is rectilinear and joins the expansion direction intermediate portion 36D at the lower end portion of the distal end chamber 36 and the expansion direction intermediate portion 34D at the lower end portion of the front-rear chamber 34.

Further, the peripheral edge portion of the lower tether 38, which is other than the rear end edge portion thereof, is attached by sewing to the lower end portion of the front-rear chamber 34 and the lower end portion of the distal end chamber 36, from the expansion direction intermediate portion 34D at the lower end portion of the front-rear chamber 34 to the expansion direction intermediate portion 36D at the lower end portion of the distal end chamber 36.

Note that, as illustrated in FIG. 1, the upper tether 37 does not interfere with (does not hit) the head Ph of the passenger P because it is positioned at the upper side of the head Ph of the passenger P. Further, although the lower tether 38 is positioned at the neck of the passenger P, because the lower tether 38 is in the form of a thin cloth as described above, even if the lower tether 38 interferes with the neck (hits the neck), the injury value imparted to the neck is low.

As illustrated in FIG. 3 and FIG. 4, a side frame 22, which is one of a pair of left and right seatback frames that extend in the vertical direction at the left and right both sides of the interior of the seatback 14 and are formed in substantial "U" shapes as seen in a planar sectional view, is provided such that the open side thereof is directed toward the seat width direction inner side. The upper frame 24, which is one of the seatback frames and is formed in a substantially upside-down "U" shape as seen in front view, spans between the upper end portions of the left and right side frames 22. The pair of left and right headrest supports 26 are provided integrally with the seat width direction central portion of this upper frame 24.

As illustrated in FIG. 1 through FIG. 4, the lower end portion of a movable plate 44, which serves as a movable member and structures a force limiter mechanism 40, is supported by a shaft 42 so as to be able to rotate with the seat width direction being the axial direction, at the lower end portion of the outer surface side of the side frame 22 that is at the left side. The movable plate 44 is formed in the shape of a flat plate and extends in the vertical direction, and the width thereof is made to be smaller than the width of the side frame 22.

The inflator 28 is fixed to the outer surface side of the movable plate 44. Namely, the inflator 28 is formed substantially in the shape of a cylinder having a bottom, and a portion of the outer peripheral surface thereof is mounted integrally to the outer surface of the movable plate 44 via a bracket (not illustrated) or the like, such that the axially central portion of the inflator 28 is directed in the vertical direction.

The inflator 28 is electrically connected to an airbag ECU (not illustrated) that is provided at the vehicle. The airbag ECU and a detecting device (not illustrated), such as an acceleration sensor or the like provided at the vehicle, are electrically connected. Accordingly, due to a collision of the vehicle being detected by the detecting device, the inflator 28 operates via the airbag ECU, and jets-out gas instantaneously.

Note that the inflator 28 may be a structure that operates due to a collision of the vehicle being predicted by a collision predicting sensor (not illustrated) or the like, and not a structure that operates due to a collision of the vehicle being detected.

The lower end portion of a metal pipe 46, which serves as a supply pipe and which, together with the movable plate 44, structures the force limiter mechanism 40, is mounted to, by being fit with, a jetting port 28A that is the upper end portion of the inflator 28. The upper portion side of the metal pipe 46 is bent in the shape of a crank toward the seat width direction inner side so as to follow along the shape of the seatback 14. The rear end portion of the airbag main body 32 is attached to an upper end portion 46A of the metal pipe 46.

Namely, the metal pipe 46 is structured so as to be able to supply the gas, which is jetted-out from the inflator 28, to the airbag main body 32 that is attached to the upper end portion of the metal pipe 46, and is structured such that the airbag main body 32 can be disposed near the head Ph of the passenger P. Note that the side frame 22 and the rear end portion of the airbag main body 32 are connected by the metal pipe 46 and (via the inflator 28) the movable plate 44 that structure the force limiter mechanism 40.

Further, as illustrated in FIG. 2, the portions, which are further toward the lower side than the case portion 20, of the metal pipe 46 and the movable plate 44 to which the inflator 28 is fixed are provided at the interior of the seatback 14. Accordingly, when the movable plate 44 and the metal pipe 46 rotate toward the front side as will be described later, the movable plate 44 and the metal pipe 46 rupture the skin of the seatback 14 and rotate toward the front side.

Figure 5:
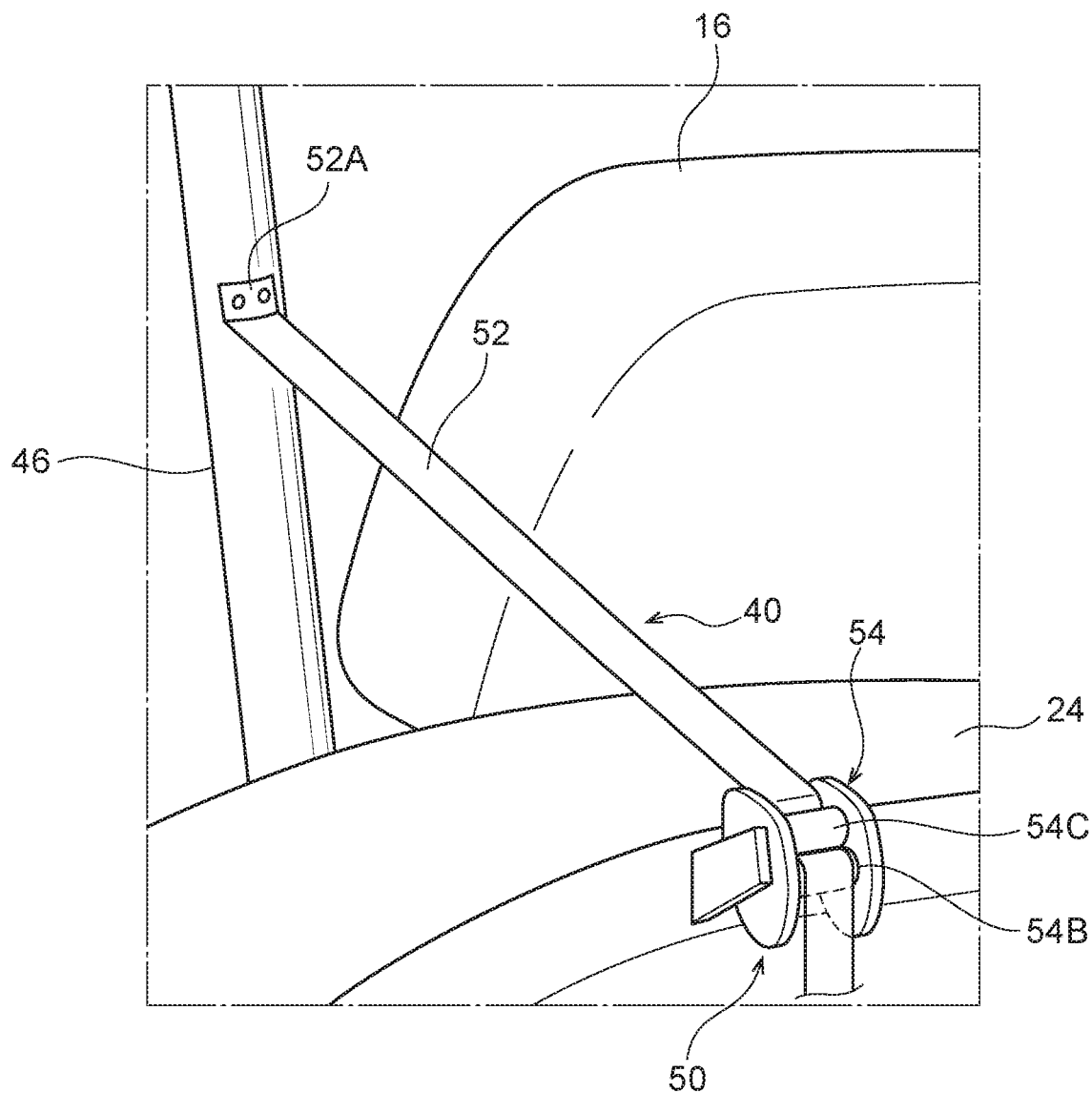
FIG. 5 is a perspective view illustrating the structure of an energy absorbing portion at the force limiter mechanism of the in-seat airbag device relating to the first embodiment.

Further, as illustrated in FIG. 5, an energy absorbing portion 50, which, together with the movable plate 44 and the metal pipe 46, structures the force limiter mechanism 40, is provided between the metal pipe 46 (or the movable plate 44) and the upper frame 24. The energy absorbing portion 50 is structured so as to, at the time of head restraining when the head Ph of the passenger P is restrained, when the load (the tensile load) toward the front side that is applied to the airbag main body 32 exceeds a predetermined threshold value (reaches predetermined load G2 shown in FIG. 8), operate and permit rotation of the movable plate 44 and the metal pipe 46 toward the front side while absorbing energy at a constant load (load G3 that is lower than load G2).

Figure 6A:
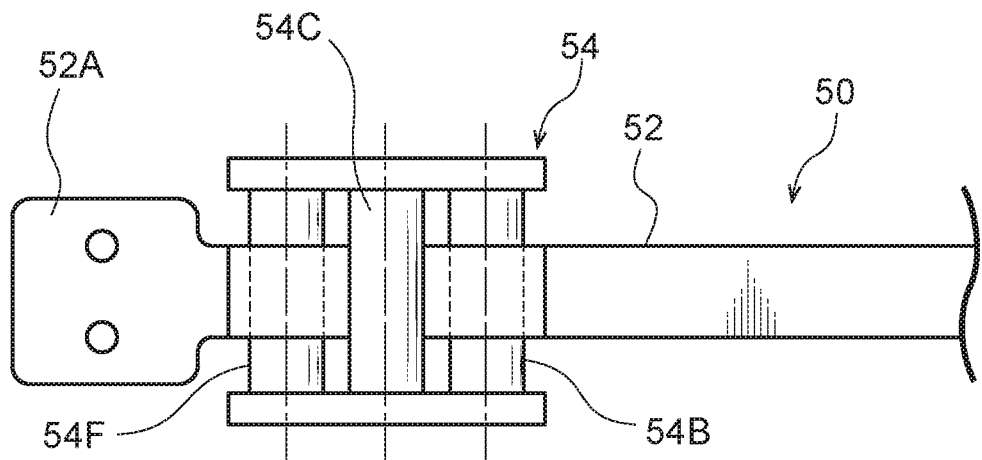
FIG. 6A is a plan view illustrating the structure of the energy absorbing portion at the force limiter mechanism of the in-seat airbag device relating to the first embodiment.
Figure 6B:
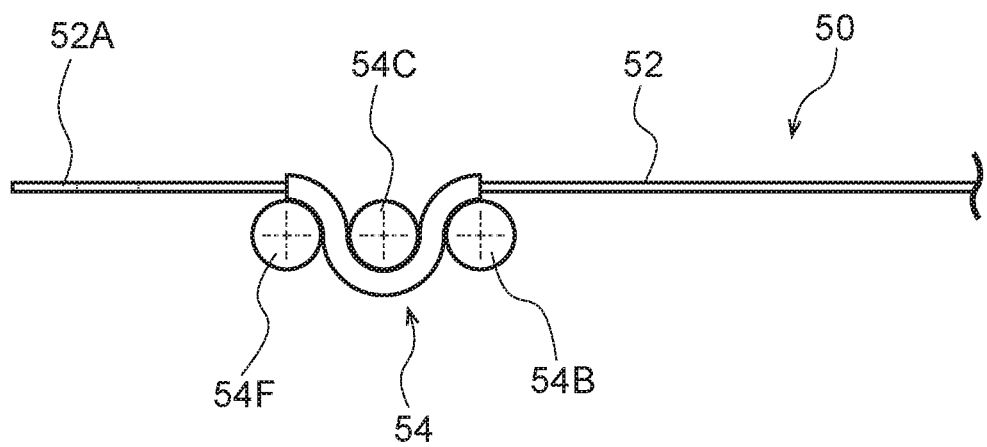
FIG. 6B is a side view illustrating the structure of the energy absorbing portion at the force limiter mechanism of the in-seat airbag device relating to the first embodiment.

Namely, as illustrated in FIG. 5 through FIG. 6B, the energy absorbing portion 50 is structured to include a plate 52 that is strip-shaped and is made of metal and absorbs energy at a constant value by being fed-out toward the front side while being plastically deformed (while being handled) by a roller portion 54 that is described later, and the roller portion 54 on which the plate 52 is trained.

The plate 52 is supported so as to be able to be paid-out, at a lower frame (not illustrated) that serves as a seatback frame, in a state in which the plate 52 is wound in the form of a roll (not illustrated). After a free end 52A of the plate 52 is trained along the roller portion 54, the free end 52A is mounted and fixed by screws or the like to the outer peripheral surface of the metal pipe 46 (see FIG. 5).

The roller portion 54 is supported at the upper frame 24, and has three rollers that are a front roller 54F, a central roller 54C and a rear roller 54B that are disposed at a predetermined interval in that order from the front side. The free end 52A side of the plate 52 is trained on the rear roller 54B, and thereafter, passes-through the gap between the rear roller 54B and the central roller 54C and is trained on the central roller 54C, and then is passed through the gap between the central roller 54C and the front roller 54F and is trained on the front roller 54F.

Further, at usual times (in the state before the plate 52 is fed-out toward the front side), the thickness of the (one) plastic deformation region that is the portion of the plate 52 that is trained on the roller portion 54 is set to be thicker than the thickness of the other plastic deformation regions (see FIG. 6B). Due thereto, there is a structure in which the force limiter mechanism 40 does not operate at the load toward the front side at the time of inflation/expansion of the airbag main body 32 (the tensile load shown as load G1 in FIG. 8).

Namely, at the load (the tensile load) toward the front side at the time of inflation/expansion of the airbag main body 32, the plate 52 does not travel through the roller portion 54, or it is extremely difficult for the plate 52 to travel through the roller portion 54. Due thereto, the plate 52 cannot be fed-out toward the front side. In other words, the plate 52 withstands the load (the tensile load) toward the front side at the time of inflation/expansion of the airbag main body 32 (withstands the load and does not move).

Operation of the airbag device 30 relating to the first embodiment that is structured as described above is described next.

When the detecting device detects that the vehicle has front-collided, the inflator 28 operates and instantaneously jets gas into the interior of the airbag main body 32. When gas is jetted to the airbag main body 32 interior, due to the expansion of the airbag main body 32 (i.e., by being pushed from the inner side by the airbag main body 32), the case portion 20 ruptures.

Then, the airbag main body 32 expands from the case portion 20 past the left side of the head Ph of the passenger P (in the gap between the head Ph of the passenger P at the side window side and the head of the unillustrated passenger at the center seat side) toward the front side. Namely, when the front-rear chamber 34 inflates and expands, and is disposed at the left side of the head Ph of the passenger P, gas flows from the front side end portion of the front-rear chamber 34 into the distal end chamber 36, and the distal end chamber 36 inflates and expands toward the seat width direction inner side.

Then, at least the head Ph of the passenger P seated in the vehicle seat 10 is restrained by the airbag main body 32 (the front-rear chamber 34 and the distal end chamber 36) that has expanded completely. Namely, forward movement of at least the head Ph of the passenger P due to inertial force can be suppressed by the airbag main body 32 (the front-rear chamber 34 and the distal end chamber 36).

Figure 7:
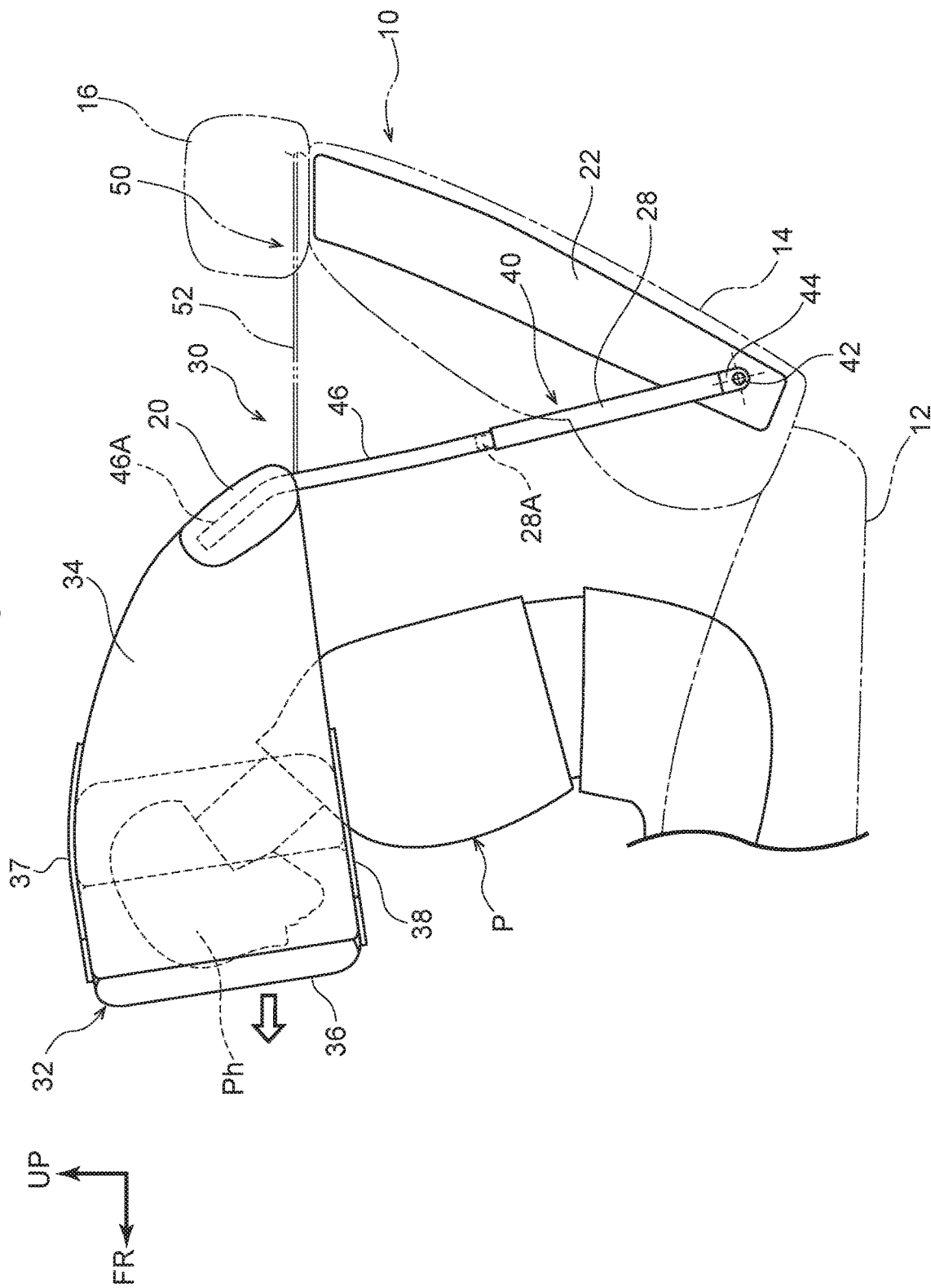
FIG. 7 is a side view illustrating a state in which the force limiter mechanism of the in-seat airbag device relating to the first embodiment has operated.

Here, the rear end portion of the airbag main body 32 and the side frame 22 are connected by the force limiter mechanism 40. When the load (the tensile load) toward the front side that is applied to the airbag main body 32 exceeds a predetermined threshold value (reaches predetermined load G2 shown in FIG. 8) at the time of head restraining when the head Ph of the passenger P is restrained, the force limiter mechanism 40 moves the airbag main body 32 toward the front side as illustrated in FIG. 7.

Specifically, due to the plate 52 that structures the energy absorbing portion 50 traveling through the roller portion 54, the plate 52 is fed-out while plastically deforming (while being handled) such that the thickness thereof is reduced, and due thereto, rotation of the movable plate 44 and the metal pipe 46 toward the front side is permitted while energy is absorbed at a constant value. Namely, the movable plate 44 and the metal pipe 46 rotate (move) toward the front side together with the airbag main body 32.

Accordingly, at the time of restraining the head of the passenger P, the amount of movement of the head Ph of the passenger P toward the front side becoming small, with respect to the amount of movement of the chest region of the passenger P toward the front side that is determined by the restraining force of the seatbelt, can be suppressed. Namely, the head Ph of the passenger P can be moved over a long stroke toward the front side, and the load, which is directed rearward and is applied to the head Ph of the passenger P, can be kept low. Accordingly, rearward tilting of the neck of the passenger P can be suppressed effectively.

Figure 8:
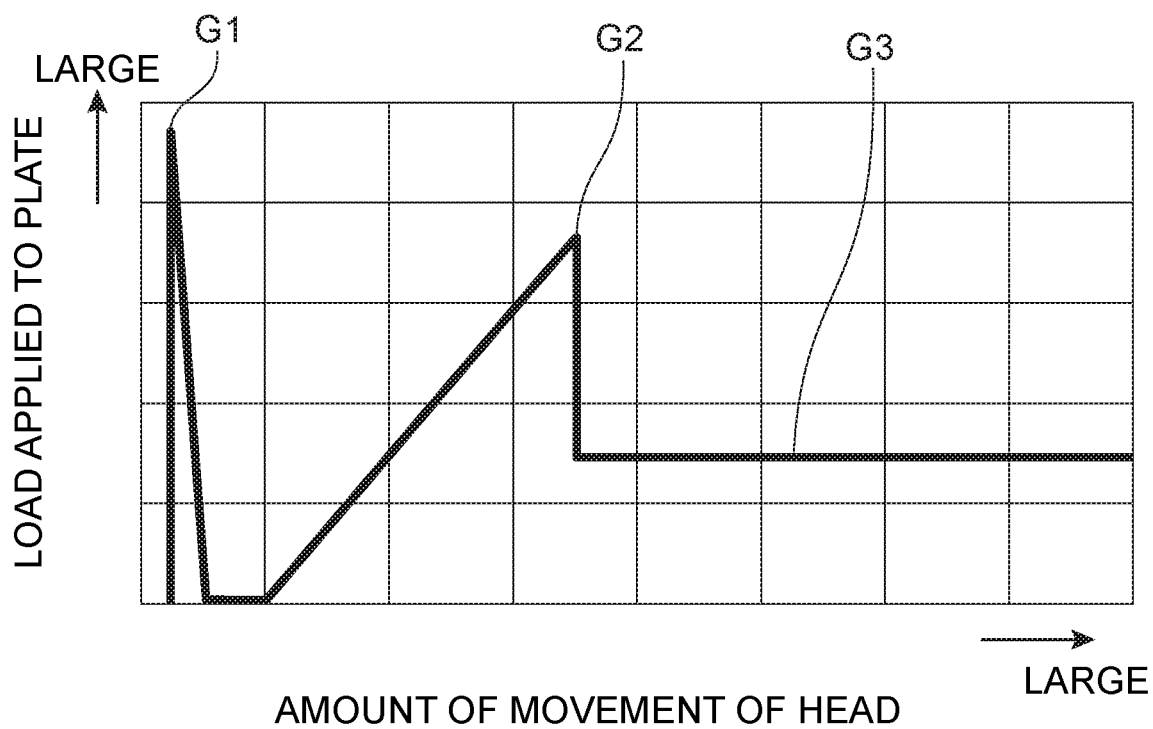
FIG. 8 is a graph illustrating the load-displacement characteristic (F-S characteristic) at a time of restraining the head of a passenger by the in-seat airbag device relating to the first embodiment.

Further, the force limiter mechanism 40 does not operate at the load toward the front side at the time of inflation/expansion of the airbag main body 32 (i.e., at the tensile load shown as load G1 in FIG. 8). Namely, the thickness of one plastic deformation region of the plate 52 that absorbs energy by plastic deformation (i.e., the portion that is trained along the roller portion 54) is set to be thicker than the thickness of the other plastic deformation regions. Due thereto, the force limiter mechanism 40 can withstand the load (the tensile load) toward the front side at the time of inflation/expansion of the airbag main body 32.

Accordingly, at the load (the tensile load) toward the front side at the time of inflation/expansion of the airbag main body 32, the head Ph of the passenger P can be restrained more effectively as compared with a case in which the force limiter mechanism 40 is operated. Further, the structure of the energy absorbing portion 50 can be simplified as compared with a case in which the force limiter mechanism is made to withstand the load toward the front side at the time of inflation/expansion of the airbag main body 32 by using a method other than setting the thicknesses of the plastic deformation regions of the plate 52.

FIG. 8 illustrates the load-displacement characteristic (F-S) characteristic due to the airbag main body 32 at the time of restraining the head of the passenger P, and more specifically, the relationship between the load applied to the plate 52 and the amount of movement of the head of the passenger P. As illustrated in FIG. 8, at the load G1 that is applied to the plate 52 at the time of inflation/expansion of the airbag main body 32, the amount of movement of the head of the passenger P is small. Namely, the force limiter mechanism 40 does not operate.

Thereafter, when the predetermined load G2 is reached (the predetermined threshold value is exceeded) at the time of restraining the head by the airbag main body 32, the force limiter mechanism 40 (the energy absorbing portion 50) operates, and the load acting on the head Ph of the passenger P (the load applied to the plate 52) is kept smaller than the load G2, and the head Ph of the passenger P can be made to move over a long stroke at that constant load.

Modified Example

Figure 9:
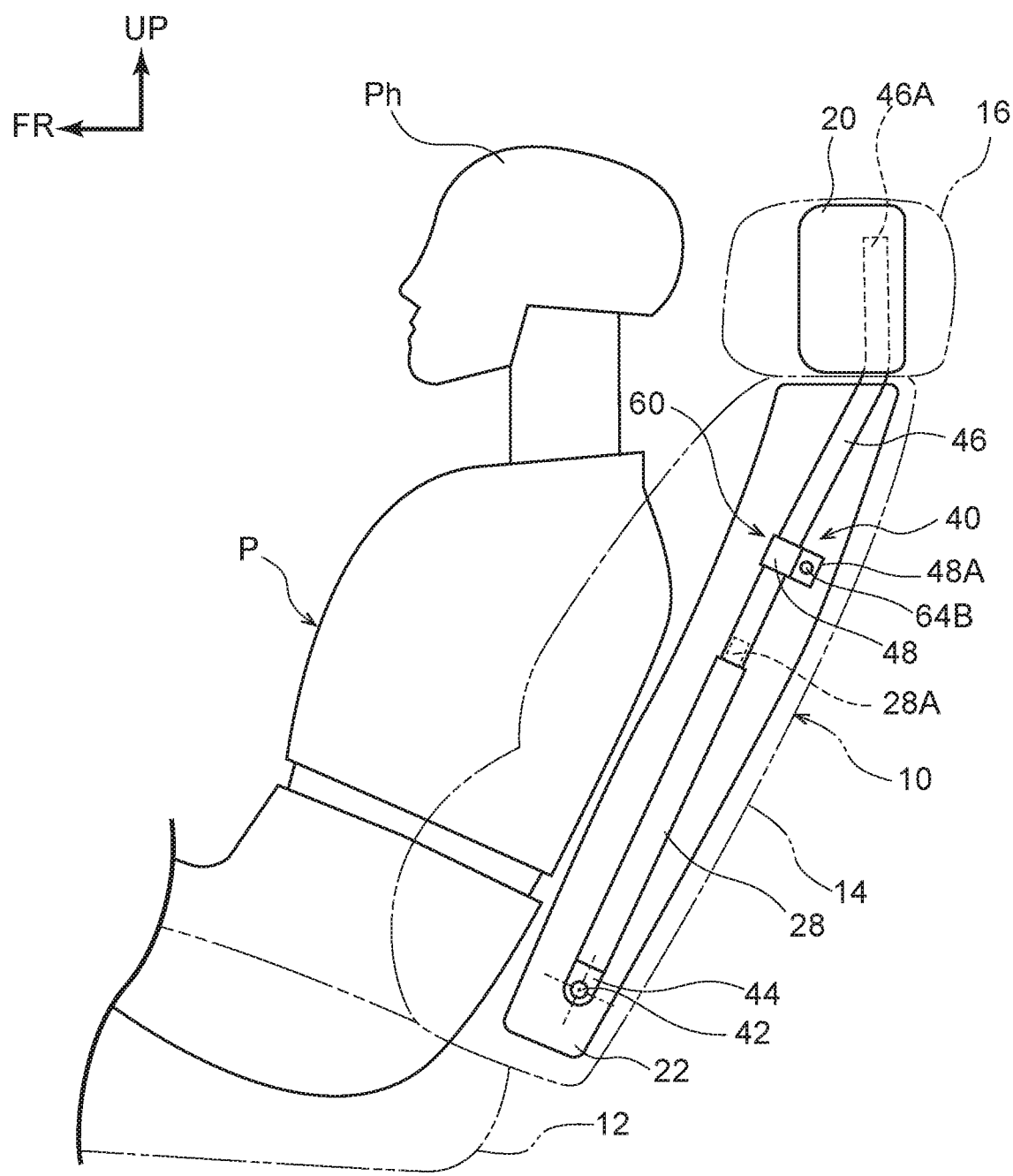
FIG. 9 is a side view illustrating a modified example of the force limiter mechanism of the in-seat airbag device relating to the first embodiment.
Figure 10:
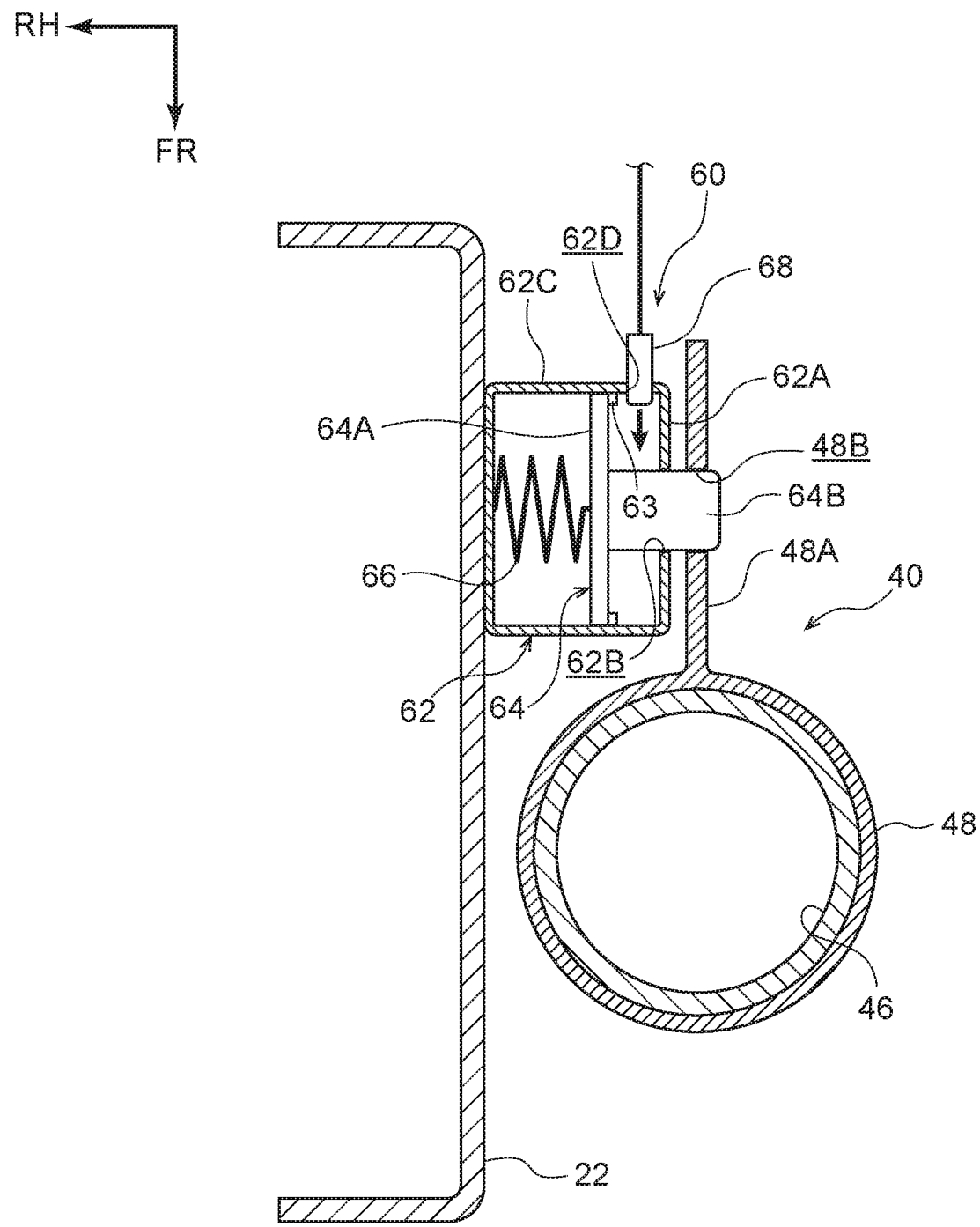
FIG. 10 is an enlarged plan view illustrating, in a partially broken manner, the structure of the modified example of the force limiter mechanism of the in-seat airbag device relating to the first embodiment.

Note that the structure that makes the force limiter mechanism 40 not operate at the load toward the front side at the time of inflation/expansion of the airbag main body 32 (the tensile load shown as load G1 in FIG. 8) may be the structure shown in FIG. 9 and FIG. 10 for example. Namely, the force limiter mechanism 40 may be structured to include an actuator 60 that operates the force limiter mechanism 40 when the predetermined load G2 is reached (the predetermined threshold value is exceeded) at the time when the head of the passenger P is restrained.

More specifically, the actuator 60 is provided at the upper portion side of the side frame 22, and has, within a case 62 that is shaped as a hollow cylinder that is round as seen in side view, a coil spring 66 serving as an urging member and an engaging portion 64 that projects-out toward the seat width direction outer side (the left side) due to the urging force of the coil spring 66. The engaging portion 64 is formed in a substantial "T" shape as seen in plan view, and has a disk portion 64A and a cylinder portion 64B provided integrally with the axially central portion of the disk portion 64A.

A through-hole 62B, which is round and whose inner diameter is larger than the outer diameter of the cylinder portion 64B, is formed in an outer wall portion 62A that is at the seat width direction outer side of the case 62. The cylinder portion 64B projects-out toward the seat width direction outer side from this through-hole 62B. Note that, at the engaging portion 64, the amount of projection of the cylinder portion 64B thereof from the outer wall portion 62A is restricted due to the outer peripheral edge portion of the disk portion 64A interfering with (abutting) a stopper portion 63 that is provided so as to project-out at the inner surface of a peripheral wall 62C of the case 62.

The jetting port of a micro gas generator (MGG) 68 is inserted in a through-hole 62D that is provided in the peripheral wall 62C between the disk portion 64A of the engaging portion 64 (the stopper portion 63) and the outer wall portion 62A. Gas can be jetted into the space between the disk portion 64A of the engaging portion 64 and the outer wall portion 62A. Namely, due to gas being jetted-out from the micro gas generator 68, the engaging portion 64 moves toward the seat width direction inner side against the urging force of the coil spring 66, and pulls the cylinder portion 64B into the case 62.

On the other hand, a ring portion 48 that is shaped as a cylindrical tube is fit with and fixed to the metal pipe 46. A flange portion 48A, which is shaped as a rectangular, flat plate and projects-out toward the rear side, is formed integrally with the outer peripheral surface of the ring portion 48. A though-hole 48B that is circular and passes-through in the seat width direction is formed in the flange portion 48A so as to, for example, have the same inner diameter as the through-hole 62B. The cylinder portion 64B, whose amount of protrusion is restricted by the stopper portion 63, can be inserted in this through-hole 48B.

Namely, due to the cylinder portion 64B of the engaging portion 64 being inserted in the through-hole 48B of the flange portion 48A, locking is carried out such that rotation of the metal pipe 46 and the movable plate 44 toward the front side is inhibited. Further, due to gas being jetted-out from the micro gas generator 68 and the cylinder portion 64B being pulled into the case 62 and coming away from the through-hole 48B, rotation of the metal pipe 46 and the movable plate 44 toward the front side becomes possible (locking is released).

In accordance with the actuator 60 that is structured in this way, the force limiter mechanism 40 can be made to not operate at the load (the tensile load) toward the front side at the time of inflation/expansion of the airbag main body 32. The force limiter mechanism 40 can be operated due to gas being jetted-out from the micro gas generator 68 when the predetermined load G2 is reached (the predetermined threshold value is exceeded) at the time when the head of the passenger P is restrained. Accordingly, the force limiter mechanism 40 can be operated more reliably as compared with a case in which the force limiter mechanism 40 is operated by using a method other than the actuator 60.

Second Embodiment

The airbag device 30 relating to the second embodiment is described next. Note that regions that are equivalent to those of the above-described first embodiment are denoted by the same reference numerals, and detailed description thereof is omitted appropriately.

Figure 11:
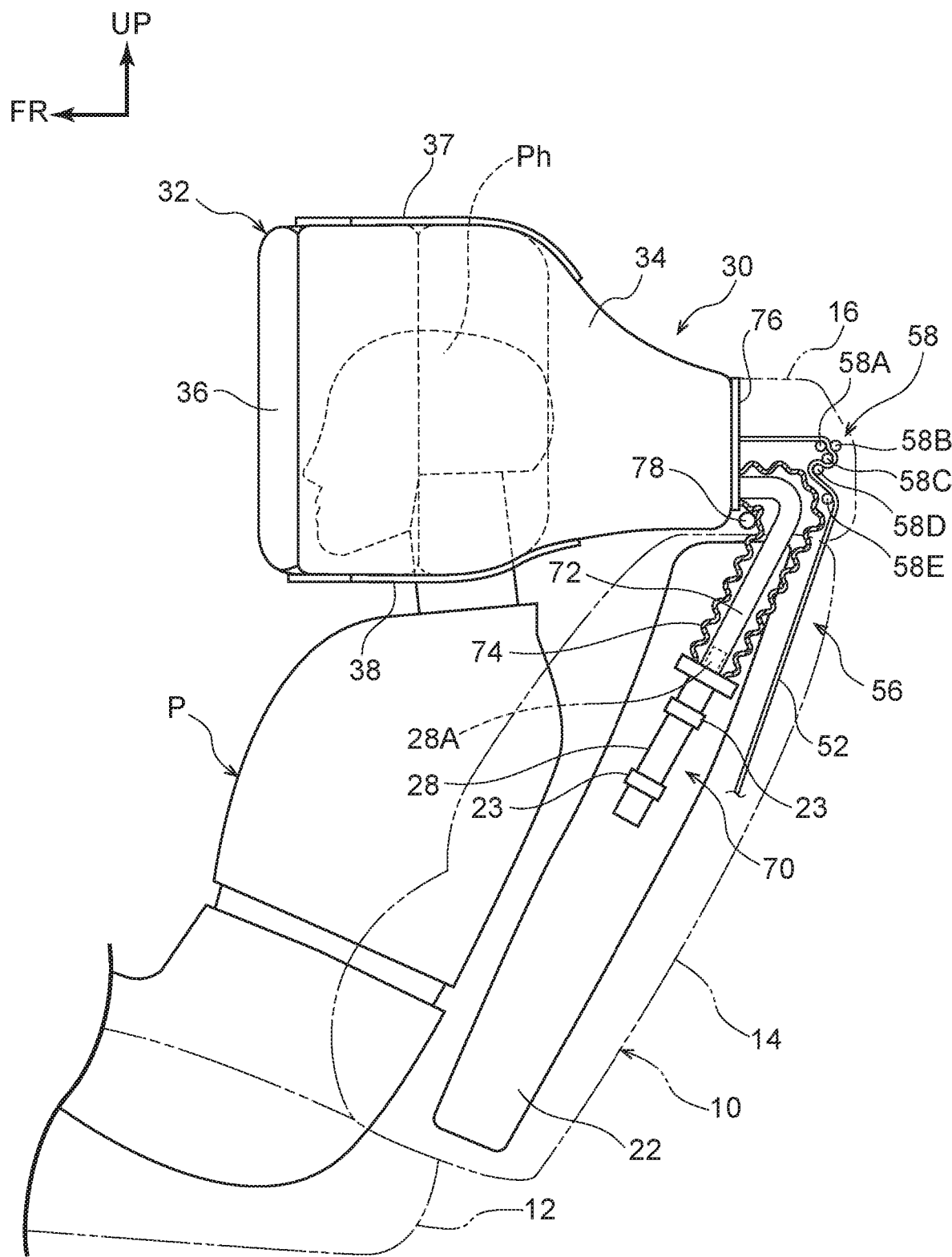
FIG. 11 is a side view illustrating a state after expansion of an in-seat airbag device relating to a second embodiment.
Figure 12:
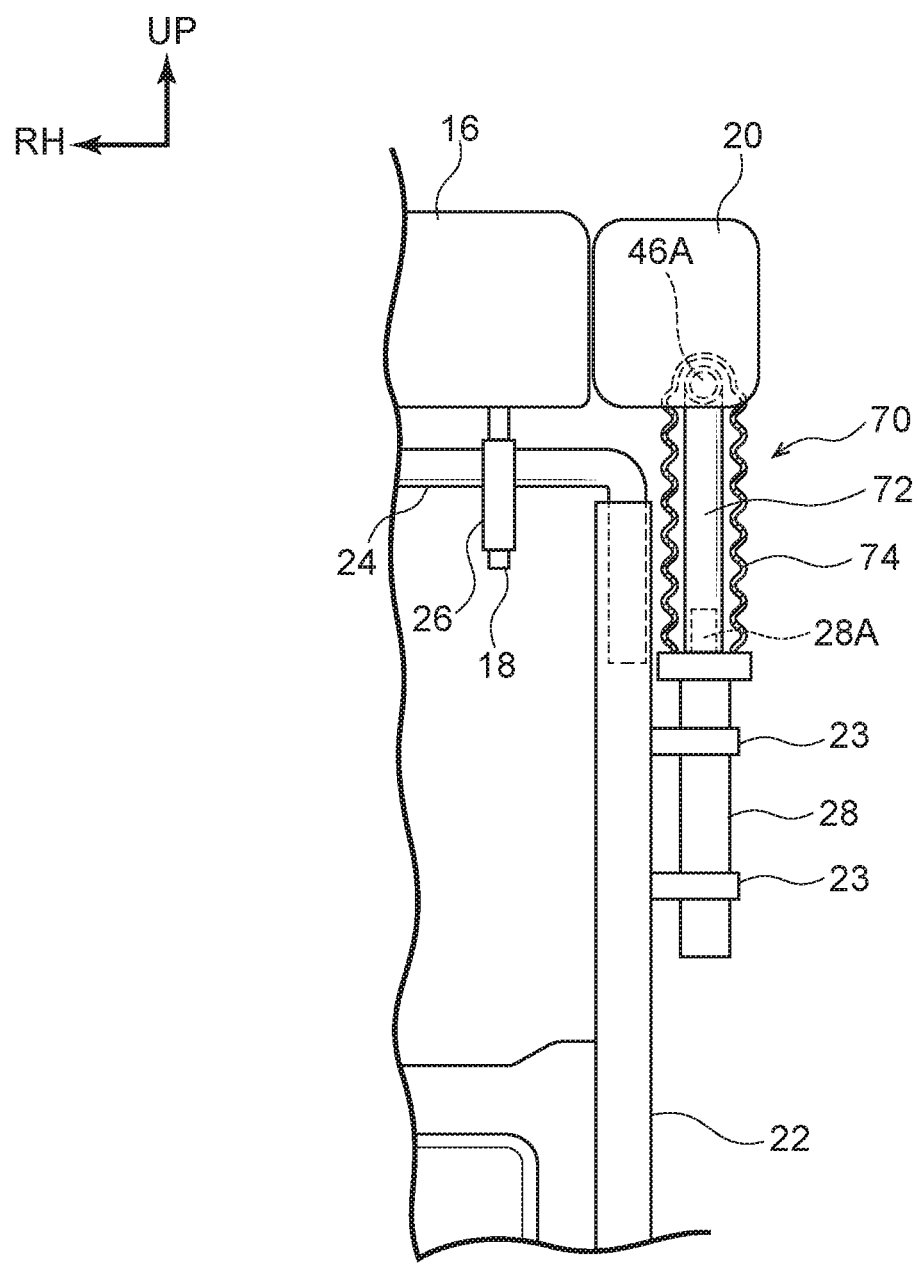
FIG. 12 is a front view of the left half, illustrating the structure of a force limiter mechanism of the in-seat airbag device relating to the second embodiment.

As illustrated in FIG. 11 and FIG. 12, the airbag device 30 relating to the second embodiment differs from the first embodiment only with regard to the point of having a force limiter mechanism 70 that is different than the force limiter mechanism 40. The force limiter mechanism 70 relating to the second embodiment does not have the movable plate 44, and the inflator 28 is fixed directly to the outer surface of the side frame 22.

Namely, a portion of the outer peripheral surface of the inflator 28 is mounted integrally via a bracket 23 or the like to the outer surface of the side frame 22 such that the axially central portion of the inflator 28 is directed in the vertical direction. Further, the lower end portion of a metal pipe 72, which serves as a supply pipe and structures the force limiter mechanism 70, is mounted to, by being fit with, the jetting port 28A that is the upper end portion of the inflator 28. The rear end portion of the airbag main body 32 is attached to the upper end portion of the metal pipe 72.

Namely, the metal pipe 72 is fixed to the side frame 22 via the inflator 28, and the gas, which is jetted-out from the inflator 28, can be supplied to the airbag main body 32 that is attached to the upper end portion of the metal pipe 72. Further, a tube 74, that has excess length and connects the upper end portion of the inflator 28 and the rear end portion of the airbag main body 32, is provided at the outer peripheral side of the metal pipe 72. In other words, the metal pipe 72 is accommodated within the tube 74.

The rear end portion of the airbag main body 32 and the side frame 22 are connected by the metal pipe 72 and the tube 74 that structure the force limiter mechanism 70. Note that, as will be described later, when the airbag main body 32 moves toward the front side, the rear end portion of the airbag main body 32 comes away from the upper end portion of the metal pipe 72.

Namely, when the load (tensile load) toward the front side that is applied to the airbag main body 32 exceeds a predetermined threshold value, the upper end portion of the metal pipe 72 comes away from the rear end portion of the airbag main body 32. At this time, an intermediate portion of the tube 74 is supported by a guide portion 78 that is solid cylindrical and is provided at the upper frame 24 or the like with the seat width direction being the axial direction thereof (i.e., the intermediate portion of the tube 74 is bent substantially in a sideways "V" shape).

A reaction force plate 76 that is shaped as a flat plate is attached to the rear end portion of the airbag main body 32. An energy absorbing portion 56, which structures the force limiter mechanism 70 together with the metal pipe 72, the tube 74 and the reaction force plate 76, is provided between the reaction force plate 76 and the side frame 22 (or an unillustrated lower frame).

The energy absorbing portion 56 operates when the load (tensile load) toward the front side that is applied to the airbag main body 32 exceeds a predetermined threshold value (reaches the predetermined load G2 shown in FIG. 8) at the time of head portion restraining when the head Ph of the passenger P is restrained. The energy absorbing portion 56 permits movement of the reaction force plate 76 (the airbag main body 32) toward the front side while absorbing energy at a constant load (load G3 that is lower than load G2).

Namely, the energy absorbing portion 56 is structured similarly to the energy absorbing portion 50 of the first embodiment, and is structured to include the plate 52 and a roller portion 58 on which the plate 52 is trained. Namely, the energy absorbing portion 56 differs from the energy absorbing portion 50 of the first embodiment only with respect to the structure of the roller portion 58.

More specifically, the roller portion 58 is supported within the case portion 20 that accommodates the airbag main body 32 and the upper end portions of the metal pipe 72 and the tube 74. The roller portion 58 has five rollers that are, from the upper front side, a first roller 58A and a second roller 58B, and a third roller 58C provided at the lower side thereof, and a fourth roller 58D provided at the lower side thereof, and a fifth roller 58E provided at the lower side thereof.

After the free end 52A (see FIG. 5 through FIG. 6B) side of the plate 52 is trained on the fifth roller 58E from the rear side, the free end 52A side is trained on the fourth roller 58D from the front side, and next is trained on the third roller 58C from the rear side, and finally is passed through the gap between the second roller 58B and the first roller 58A and is fixed to the reaction force plate 76.

Further, at usual times (in the state before the plate 52 is fed-out toward the front side), the thickness of the one plastic deformation region of the plate 52 that is the portion trained on the roller portion 58 is set to be thicker than the thickness of the other plastic deformation regions. Due thereto, the force limiter mechanism 70 does not operate at the load toward the front side (the tensile load shown as load G1 in FIG. 8) at the time of inflation/expansion of the airbag main body 32.

Namely, at the load (the tensile load) toward the front side at the time of inflation/expansion of the airbag main body 32, the plate 52 does not travel through the roller portion 58, or it is extremely difficult for the plate 52 to travel through the roller portion 58. Due thereto, the plate 52 cannot be fed-out toward the front side. In other words, the plate 52 withstands the load (the tensile load) toward the front side at the time of inflation/expansion of the airbag main body 32 (withstands the load and does not move).

Operation of the airbag device 30 relating to the second embodiment that is structured as described above is described next. Note that description of operations that are common with the above-described first embodiment is omitted appropriately.

When the detecting device detects that the vehicle has front-collided, the inflator 28 operates and instantaneously jets gas into the interior of the airbag main body 32. When gas is jetted to the airbag main body 32 interior, due to the expansion of the airbag main body 32 (i.e., by being pushed from the inner side by the airbag main body 32), the case portion 20 ruptures.

Then, the airbag main body 32 expands from the case portion 20 past the left side of the head Ph of the passenger P (in the gap between the head Ph of the passenger P at the side window side and the head of the unillustrated passenger at the center seat side) toward the front side. Namely, when the front-rear chamber 34 inflates and expands, and is disposed at the left side of the head Ph of the passenger P, gas flows from the front side end portion of the front-rear chamber 34 into the distal end chamber 36, and the distal end chamber 36 inflates and expands toward the seat width direction inner side.

Then, at least the head Ph of the passenger P seated in the vehicle seat 10 is restrained by the airbag main body 32 (the front-rear chamber 34 and the distal end chamber 36) that has expanded completely. Namely, forward movement of at least the head Ph of the passenger P due to inertial force can be suppressed by the airbag main body 32 (the front-rear chamber 34 and the distal end chamber 36).

Figure 13:
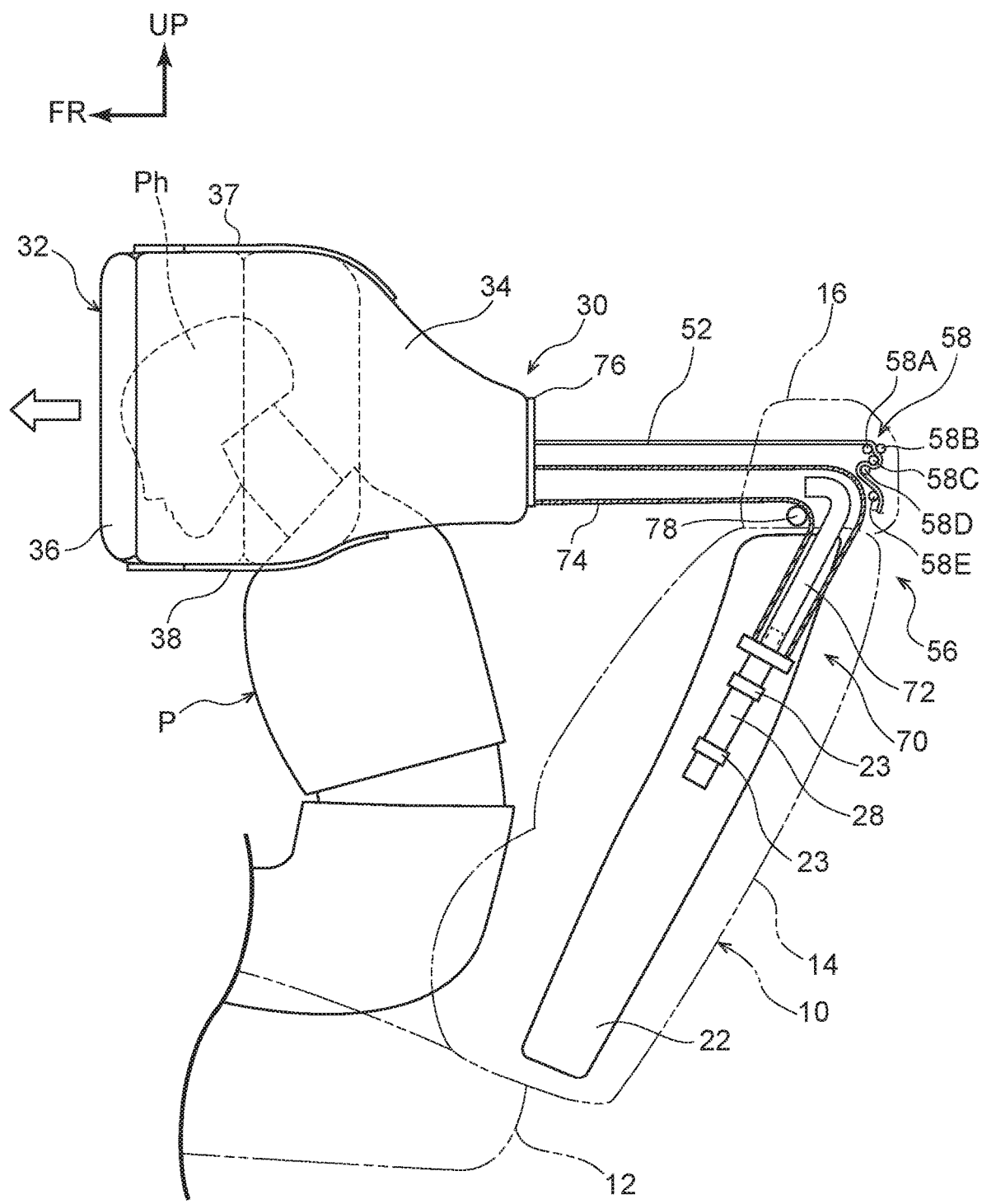
FIG. 13 is a side view illustrating a state in which the force limiter mechanism of the in-seat airbag device relating to the second embodiment has operated.

Here, the rear end portion of the airbag main body 32 and the side frame 22 are connected by the force limiter mechanism 70. When the load (the tensile load) toward the front side that is applied to the airbag main body 32 exceeds a predetermined threshold value (reaches predetermined load G2 shown in FIG. 8) at the time of head restraining when the head Ph of the passenger P is restrained, the force limiter mechanism 70 moves the airbag main body 32 toward the front side as illustrated in FIG. 13.

Specifically, due to the plate 52 that structures the energy absorbing portion 56 illustrated in FIG. 11 traveling through the roller portion 58, the plate 52 is fed-out while plastically deforming (while being handled) such that the thickness thereof is reduced, and due thereto, movement of the reaction force plate 76 toward the front side is permitted while energy is absorbed at a constant value. Namely, the reaction force plate 76 moves toward the front side together with the airbag main body 32.

Accordingly, at the time of restraining the head of the passenger P, the amount of movement of the head Ph of the passenger P toward the front side becoming small, with respect to the amount of movement of the chest region of the passenger P toward the front side that is determined by the restraining force of the seatbelt, can be suppressed. Namely, the head Ph of the passenger P can be moved over a long stroke toward the front side, and the load, which is directed rearward and is applied to the head Ph of the passenger P, can be kept low. Accordingly, rearward tilting of the neck of the passenger P can be suppressed effectively.

Further, at the load toward the front side at the time of inflation/expansion of the airbag main body 32 (i.e., at the tensile load shown as load G1 in FIG. 8), the force limiter mechanism 70 does not operate. Namely, the thickness of one plastic deformation region of the plate 52 that absorbs energy by plastic deformation (i.e., the portion that is trained along the roller portion 58) is set to be thicker than the thickness of the other plastic deformation regions. Due thereto, the force limiter mechanism 70 can withstand the load (the tensile load) toward the front side at the time of inflation/expansion of the airbag main body 32.

Accordingly, at the load (the tensile load) toward the front side at the time of inflation/expansion of the airbag main body 32, the head Ph of the passenger P can be restrained more effectively as compared with a case in which the force limiter mechanism 70 is operated. Further, the structure of the energy absorbing portion 56 can be simplified as compared with a case in which the force limiter mechanism is made to withstand the load toward the front side at the time of inflation/expansion of the airbag main body 32 by using a method other than setting the thicknesses of the plastic deformation regions of the plate 52.

Further, as illustrated in FIG. 13, at the time when the reaction force plate 76 moves toward the front side together with the airbag main body 32, the rear end portion of the airbag main body 32 comes away from the upper end portion of the metal pipe 72, but, because the tube 74 extends, gas continues to be supplied to the airbag main body 32. Accordingly, even though the airbag main body 32 moves toward the front side, the state of restraining the head of the passenger P can be maintained effectively. Further, because the movable plate 44 of the first embodiment is unnecessary, the structure of the force limiter mechanism 70 can be simplified.

Although the in-seat airbag devices 30 relating to the present embodiments have been described above on the basis of the drawings, the in-seat airbag devices 30 relating to the present embodiments are not limited to the illustrated structures, and the designs thereof can be changed appropriately within a scope that does not depart from the gist of the present disclosure. For example, the supply pipe is not limited to a pipe made of metal (the metal pipe 46 and the metal pipe 72), and may be a pipe made of resin.

Further, the energy absorbing portion 50 is not limited to a structure that has the plate 52 and the roller portion 54, and the energy absorbing portion 56 as well is not limited to a structure that has the plate 52 and the roller portion 58. Although not illustrated, the energy absorbing portions 50, 56 may be structured, for example, to include a torsion bar that is provided at a retractor. In these cases as well, the structures of the energy absorbing portions 50, 56 can be simplified.

What is claimed is:

1. An in-seat airbag device comprising an airbag main body having a front-rear chamber that, due to gas jetted from an inflator that operates due to a collision of a vehicle being detected or predicted, expands past a side of a head of a passenger toward a seat front side and is disposed at the side of the head of the passenger, and a distal end chamber that expands from a seat front side end portion of the front-rear chamber toward a seat width direction inner side and is disposed at a seat front side of a face of the passenger,
    wherein the airbag main body and a seatback frame are connected by a force limiter mechanism that moves the airbag main body toward a seat front side when a load, which is toward a seat front side and is applied to the airbag main body, exceeds a predetermined threshold value at a time of head restraining when the head of the passenger is restrained.

2. The in-seat airbag device of claim 1, wherein the force limiter mechanism has:
    a movable member including a supply pipe supplying gas jetted-out from the inflator to the airbag main body that is attached to an upper end portion of the movable member, the movable member being supported at the seatback frame such that a lower end portion thereof can rotate with a seat width direction being an axial direction; and
    an energy absorbing portion that is provided between the seatback frame and the supply pipe or the movable member, and that, when the load exceeds the predetermined threshold value, permits rotation of the movable member toward a seat front side while absorbing energy.

3. The in-seat airbag device of claim 1, wherein the force limiter mechanism has:
  a supply pipe connected to an inflator that is fixed to the seatback frame, and supplying the gas, which is jetted-out from the inflator, to the airbag main body;
  a tube that has excess length, accommodates the supply pipe at an interior thereof, and connects the inflator and the airbag main body;
  a reaction force plate provided at a seat rear side end portion of the airbag main body; and
  an energy absorbing portion that is provided between the reaction force plate and the seatback frame, and that, when the load exceeds the predetermined threshold value, permits movement of the reaction force plate toward a seat front side while absorbing energy.

4. The in-seat airbag device of claim 2, wherein the force limiter mechanism is structured so as to not operate at a load toward a seat front side at a time of inflation/expansion of the airbag main body.

5. The in-seat airbag device of claim 4, wherein:
  the energy absorbing portion includes a plate that absorbs energy by plastically deforming, and
  a thickness of one deformation region of the plate is set to be thicker than a thickness of other deformation regions of the plate, such that the plate can withstand the load toward the seat front side at the time of inflation/expansion of the airbag main body.

6. The in-seat airbag device of claim 4, wherein the force limiter mechanism is structured to include an actuator that operates the force limiter mechanism at a time when the load exceeds the predetermined threshold value.

7. The in-seat airbag device of claim 3, wherein the force limiter mechanism is structured so as to not operate at a load toward a seat front side at a time of inflation/expansion of the airbag main body.

8. The in-seat airbag device of claim 7, wherein:
  the energy absorbing portion includes a plate that absorbs energy by plastically deforming, and
  a thickness of one deformation region of the plate is set to be thicker than a thickness of other deformation regions of the plate, such that the plate can withstand the load toward the seat front side at the time of inflation/expansion of the airbag main body.

9. The in-seat airbag device of claim 7, wherein the force limiter mechanism is structured to include an actuator that operates the force limiter mechanism at a time when the load exceeds the predetermined threshold value.

* * * * *